United States Patent [19]
Roman et al.

[11] Patent Number: 5,290,390
[45] Date of Patent: Mar. 1, 1994

[54] CARPET SEAM TAPE APPLICATOR

[76] Inventors: Ronald J. Roman, 1828 N. Cleveland, Chicago, Ill. 60614; Rey E. Blanco, 4303 S. Keating, Chicago, Ill. 60632

[21] Appl. No.: 949,584

[22] Filed: Sep. 23, 1992

Related U.S. Application Data

[63] Continuation-in-part of Ser. No. 835,608, Feb. 13, 1992, abandoned.

[51] Int. Cl.⁵ .............................................. B32B 31/00
[52] U.S. Cl. ...................... 156/523; 156/577; 156/579
[58] Field of Search ............ 156/574, 577, 579, 304.3, 156/304.4, 304.7, 523, 526

[56] References Cited

U.S. PATENT DOCUMENTS

| | | | |
|---|---|---|---|
| D. 188,710 | 8/1960 | Brown | D74/1 |
| D. 222,329 | 10/1971 | Cuscovitch | D8/15 |
| 708,124 | 9/1902 | Cannon | 156/575 |
| 2,947,346 | 8/1960 | Thompson | 154/42.3 |
| 3,318,753 | 5/1967 | Whitlow | 156/461 |
| 3,666,601 | 5/1972 | Wuerch | 156/527 |
| 3,673,621 | 7/1972 | Pecorella | 7/8 |
| 3,748,211 | 7/1973 | Hoopengardner | 156/575 |
| 4,536,244 | 8/1985 | Greci et al. | 156/304.4 |
| 4,613,396 | 9/1986 | Scarborough | 156/391 |
| 4,652,331 | 3/1987 | Plasencia | 156/526 |
| 4,775,442 | 10/1988 | Januska | 156/575 |
| 4,913,766 | 4/1990 | Löjdström | 156/523 |
| 5,042,221 | 8/1991 | Pacione | 52/749 |

*Primary Examiner*—David A. Simmons
*Assistant Examiner*—James J. Engel, Jr.
*Attorney, Agent, or Firm*—James A. Geppert

[57] ABSTRACT

A carpet tape seam applicator for use in the installation of carpet pieces which abut to form the seam, the applicator including a pair of U-shaped bracket portions pivotally mounted together and intersecting at a substantially right angle with a removable spindle adjacent the pivot carrying a roll of carpet tape, a pair of rollers at one end to contact the floor surface where the tape is being applied, and a centrally located arm extending rearwardly from the opposite bracket portion. The arm has a laterally curved surface to conformably receive the handle of a heat bonding iron to heat the glue on the tape and activate the glue so that the carpet edges of the abutting pieces can be pressed down onto the tape as the applicator passes thereover. The central arm and handle of the heat bonding iron are easily gripped by the installer for ease of operation.

20 Claims, 3 Drawing Sheets

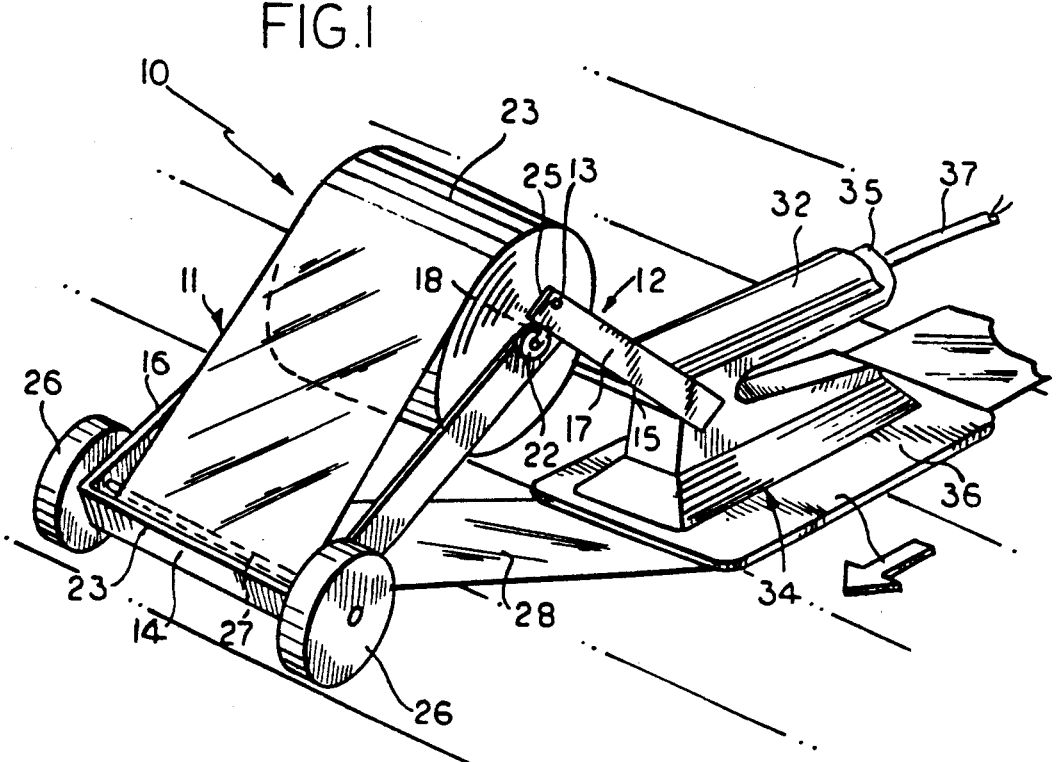
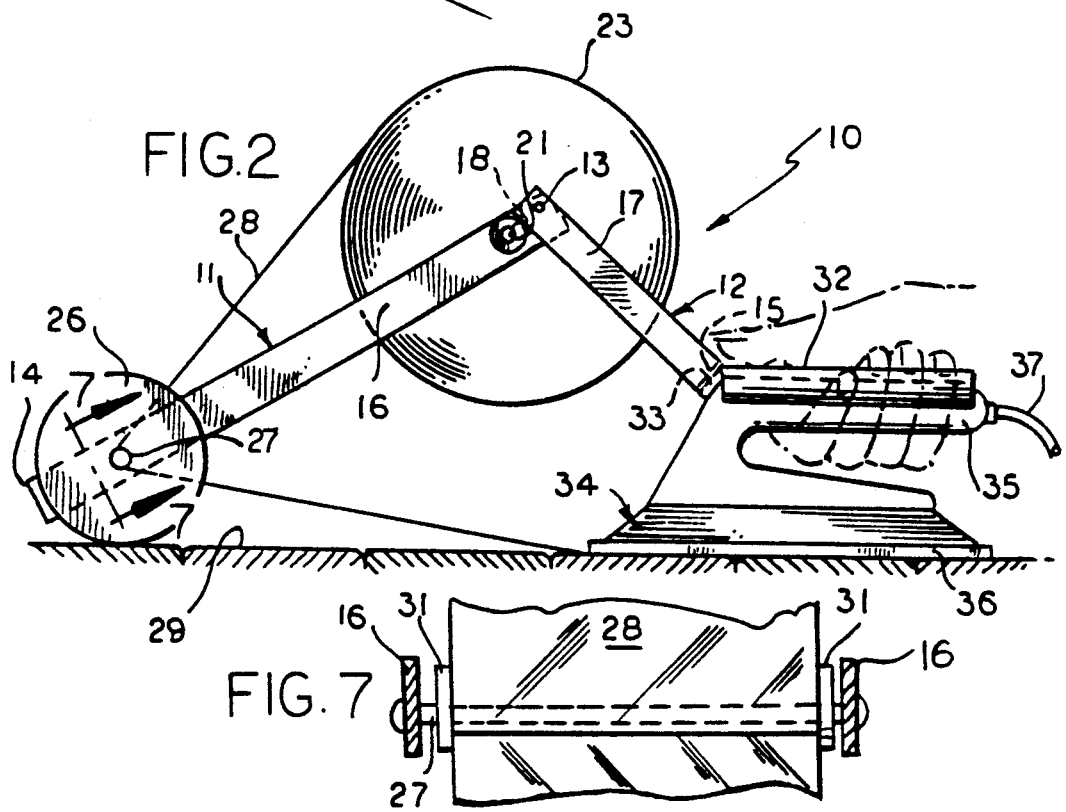

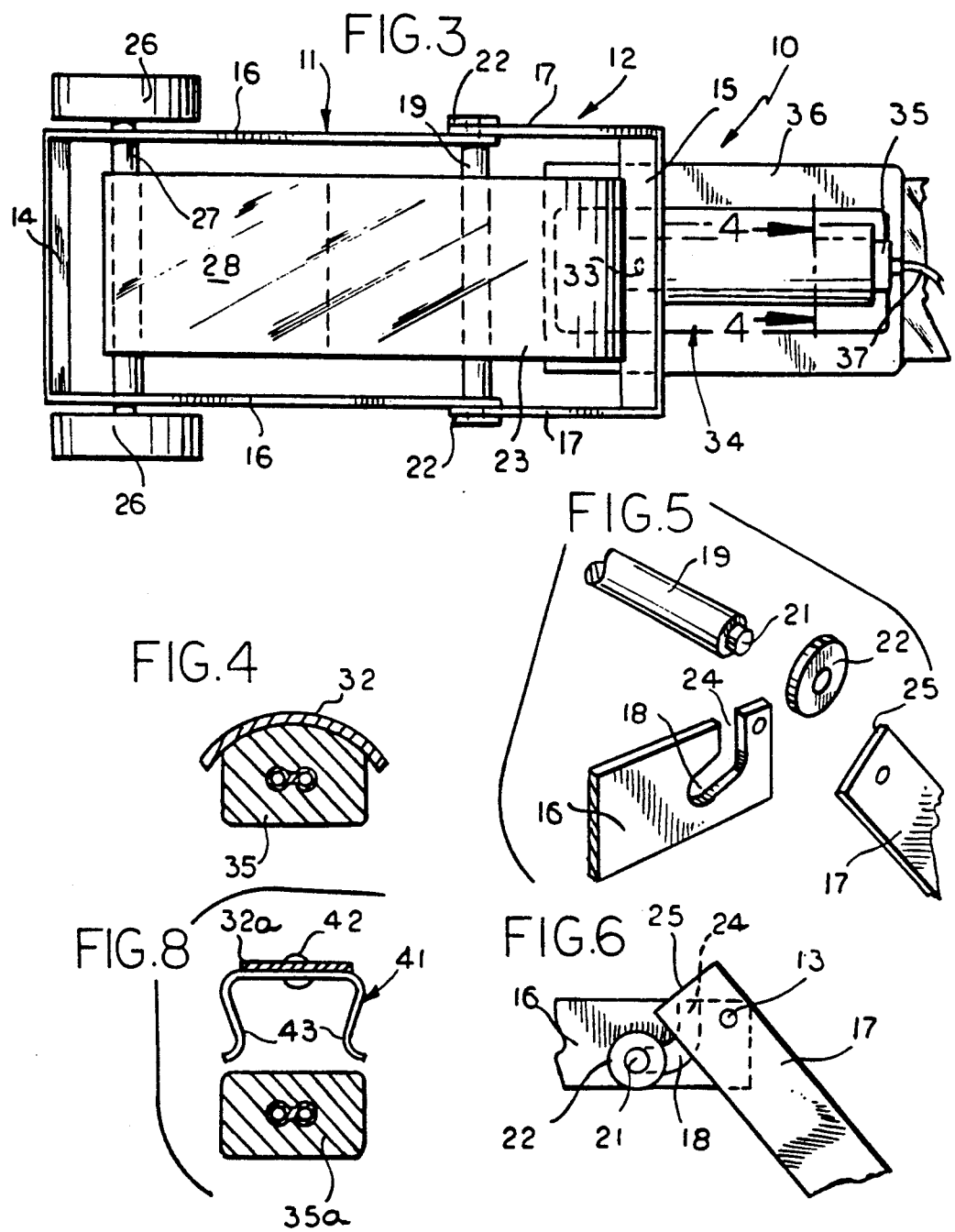

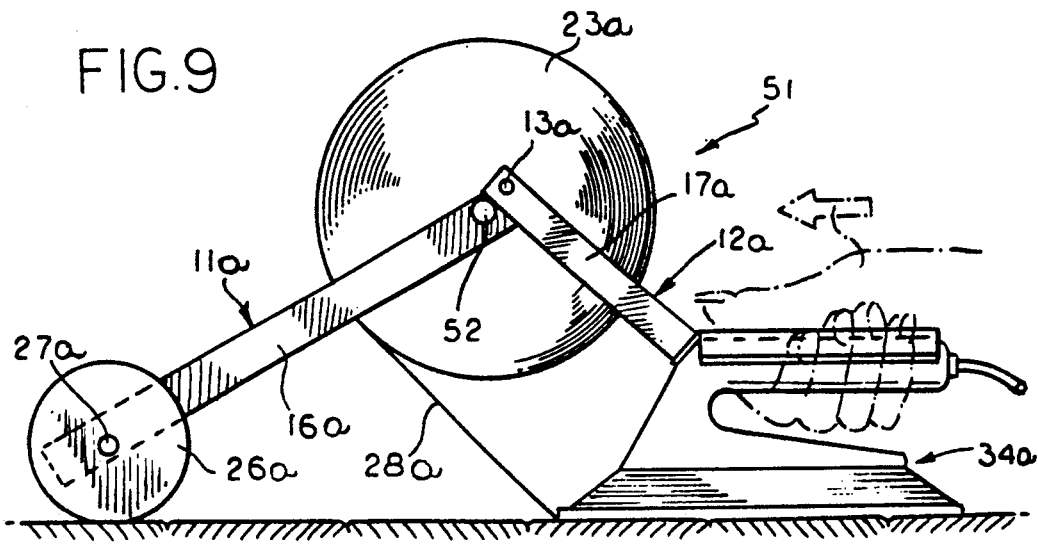
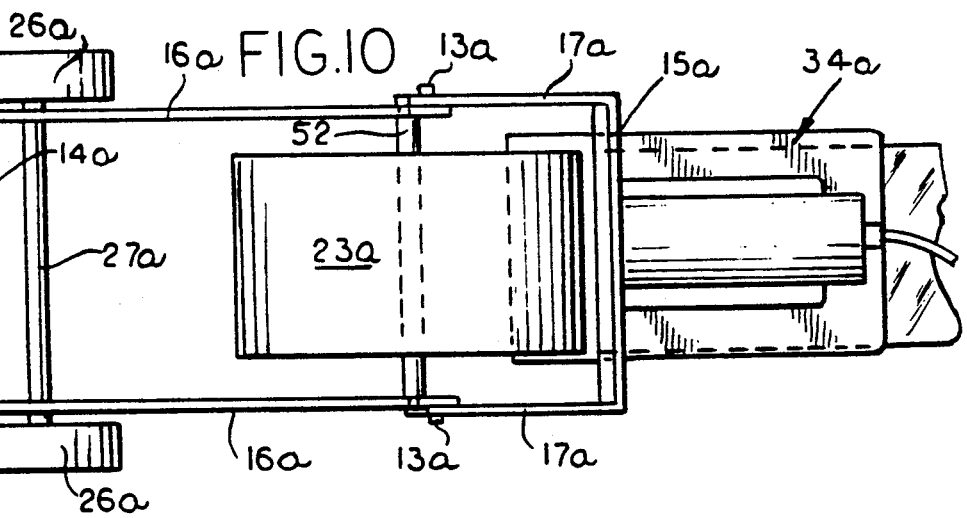
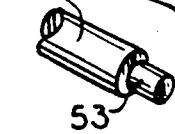
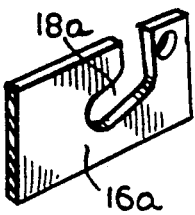
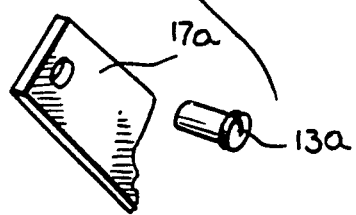
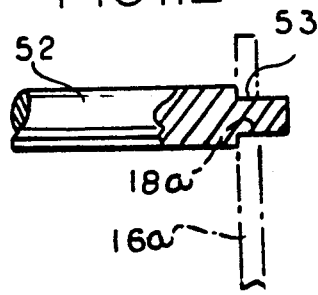

CARPET SEAM TAPE APPLICATOR

The present patent application is a continuation-in-part of our U.S. patent application Ser. No. 07/835,608, filed Feb. 13, 1992 now abandoned.

TECHNICAL FIELD

The invention disclosed herein relates to carpet seam tape applicators for use by carpet installers to simplify the job of joining abutting carpet sections during installation of the carpet in a home or place of business.

BACKGROUND

Where carpet of the wall-to-wall variety is being installed in homes, offices, stores, hotels, restaurants and other buildings by carpet installers, many of the areas to be carpeted are larger than the standard nine, twelve, fifteen or eighteen foot widths for rolls of carpet. When this occurs, installers are required to join abutting sections of carpet together with seams which either are manually sewn together or utilize special carpet tape having glue on one tape surface in a dry form; the seams being substantially invisible to provide the appearance of an uninterrupted piece of carpet. Using carpet tape, the tape is manually positioned under the seam to overlap both carpet edges where they abut and heat is then applied to the tape by the installer in the form of a heat bonding iron or other heating tool to activate the glue; the edges of the carpet sections being then manually pressed downward onto the tape and activated glue to thereby bind the seams. As can be seen from this description, the joining of the seams of carpet with the tape is slow and requires considerable time by a skilled installer. Also, the operations of cutting the carpet, stretching the carpet and securing the edges of the carpet at the intersection of the wall and floor require substantial time.

In some installations, a double-faced carpet tape is utilized for the installing and positioning of the carpet sections onto a floor, especially where carpet is being laid over a concrete floor. The double-faced tape has a pressure-sensitive adhesive on both surfaces and one surface of the tape is covered with a non-adhesive backing material to allow the tape to be easily separated while on the roll. Thus, the tape is applied with the exposed adhesive side down onto the surface that is to receive the carpet, the non-adhering backing material is removed from the tape, and the carpet is pressed onto the tape and adheres thereto.

DISCLOSURE OF THE INVENTION

The present invention is an improvement over previously known methods of applying carpet tape and the tape applicators presently used by carpet installers. In the preferred embodiment, an improved tape applicator is utilized wherein a pair of generally U-shaped bracket portions are pivoted together at their open ends and have a removable spindle mounted adjacent the pivot to carry a roll of carpet tape, small rollers are positioned at one end of the applicator and a central arm is located at the opposite end so that the applicator can be manually guided over the floor surface between the abutting sections of carpet to be joined. The applicator acts to separate the abutting carpet edges at the seam and allows the carpet tape to unroll from the source roll under the carpet edges so the carpet can be adhesively joined to form a seam. The bracket arm has means cooperating with a heat bonding iron used for heat-activation of the glue applied to the carpet tape, the bracket arm and heat bonding iron being so designed to allow ease of gripping of the arm and iron handle by the installer. Thus, the iron moves along directly behind the unrolled tape and is connected to an electric outlet to provide heat to activate the glue, and the carpet sections are immediately pressed down by the installer to form the seam.

Also, the above invention can be utilized without the heat bonding iron on the bracket where a double-sided carpet tape is used for application to a cement floor. As is well known, the double sided tape has adhesive on both sides, however, one side of the tape is covered with a non-adhesive backing material which is removed after the tape is applied to the floor. This tape can be easily applied with the above tool, wherein the arm is utilized as a short handle by the carpet installer.

BRIEF DESCRIPTION OF THE DRAWINGS

FIG. 1 is a perspective view of one embodiment of a carpet seam tape roll applicator of the present invention including a heat bonding iron.

FIG. 2 is a side elevational view of the tape roll applicator of FIG. 1.

FIG. 3 is a top plan view of the tape applicator including the heat bonding iron.

FIG. 4 is an enlarged cross sectional view of a portion of the applicator taken on the line 4—4 of FIG. 3.

FIG. 5 is an enlarged exploded partial perspective view of the pivotal connection between the bracket portions and the cooperating tape spindle.

FIG. 6 is an enlarged side elevational view of a portion of the pivotal connection between the bracket portions.

FIG. 7 is a partial cross sectional view taken on the line 7—7 of FIG. 2 but showing an alternate embodiment of tape guide to prevent lateral movement of the tape.

FIG. 8 is an exploded cross sectional view showing an alternate embodiment of retaining means on the applicator arm for the iron.

FIG. 9 is a side elevational view of a second embodiment of carpet tape laying tool similar to FIG. 1.

FIG. 10 is a top plan view of the carpet tape tool of FIG. 9.

FIG. 11 is a partial exploded perspective view of the axle and bracket structure for the roll of the carpet tape.

FIG. 12 is a side elevational view of the end of the axle for the carpet tape with a portion in cross section to show the interaction of the axle and bracket portion.

MODES FOR CARRYING OUT THE INVENTION

Referring more particularly to the disclosure in the drawings wherein are shown illustrative embodiments of the present invention, FIGS. 1 through 4 disclose a carpet tape roll applicator 10 which comprises a frame formed of a pair of generally U-shaped bracket portions 11 and 12 joined together at their open ends by pivots 13; the portions having bases 14 or 15 and pairs of sides 16, 16 or 17, 17, respectively; the sides 16 and 17 of the two portions normally intersecting at approximately right angles to each other. Each side 16 of the forward bracket portion 11 has an L-shaped slot 18 therein adjacent the pivot 13 to receive a removable spindle 19 carrying a roll of carpet tape 23 adapted to be unrolled and applied to the surface of the flooring for installation of the carpet. This spindle includes a central cylindrical shaft with reduced ends 21 receiving washers 22, 22 staked or otherwise secured thereto; the washers being located on the outside of the sides 16 of the bracket portion 11. When the bracket portions are straightened about the pivots 13, the open ends 24 of the slots 18 are uncovered so that the spindle 19 can be dropped into the slot and, when the bracket portions are returned to approximately right angles, the ends 25 of the bracket portion 12 covers the open ends 24 of slots 18 to prevent removal of the spindle.

A pair of small wheels or rollers 26 are mounted on either a single shaft 27 extending through the bracket sides 16, 16 or, in the alternative, individual stub shafts. The shaft 27 is positioned adjacent the base 14 to act as a guide means for the tape 28 coming off of the roll 23 to be applied to the floor surface 29. As seen in FIG. 7, the shaft 27 may have a pair of spaced washers 31, 31 mounted thereon within the sides 16, 16 acting to guide the tape 28 coming off the roll and prevent lateral movement thereof.

The opposite bracket portion 12 is shorter than the portion 11 and has a rearwardly extending central arm 32 with an angularly bent tab 33 secured to the base portion 15 of the bracket portion. The arm is longitudinally straight but is laterally curved as seen in FIG. 4 to conformably receive a handle portion 35 of a heat bonding iron 34. The iron includes a heating plate 36 that is closely adjacent heating elements which are heated by an electric current from an elongated cord 37 having a plug to be inserted in a conventional outlet (not shown).

Conventional carpet seaming tape has a heavy paper or similar backing and a layer of a heat-activated glue on the surface of the tape opposite to the floor surface. The tape, which is manufactured in either 4 or 6 inch widths, is mounted onto the tape mounting spindle 19 and the spindle is secured within the slots 18. The tape is then fed over the tape guide shaft 27 with a sufficient lead to be positioned past the handle or arm 32 of the applicator. The installer places the heating iron 34 under the arm 32 with the handle 35 thereof conformably received in the curvature of the arm and the applicator 10 is positioned with the roller end portion 11 between the carpet edges (not shown) which abut to form the seam.

The installer pushes the tape applicator frame and heating iron forward to separate the carpet edges and position the tape intermediate the edges so as to overlap both edges, and the heating iron contacts and heats the adhesive to activate the glue so it will bond with the carpet edges. As the applicator passes through the carpet segments, the carpet falls back to its original position and the installer applies pressure over the heated glued surface with his free hand to assure adhesion. To supplement hand pressure, the installer may utilize a conventional flat-seam form.

If a double-faced carpet tape is preferred, such as for positioning carpeting on a concrete floor, the heating iron is eliminated, and the elongated arm 32 can be grasped by the carpet installer to move the applicator along the floor surface to apply the tape. Double-faced tape is conventionally provided with a pressure sensitive adhesive on both surfaces and one surface is covered with a non-adhesive material backing, so that the tape does not stick to itself. The tape is positioned on the spindle so that the uncovered adhesive side is facing downwardly when unrolled over the guide member to be bonded to the floor surface. Once the tape is in position, the non-adhesive backing is removed and the carpet is pressed down to adhere to the tape.

FIG. 8 discloses an alternate embodiment of arm 32a which may be laterally curved or flat as desired. A pair of axially spaced spring retaining brackets 41 are suitably secured to the arm, such as by rivets 42, and the clips have resilient arms 43 to yieldably engage and retain the handle 35a of the heat bonding iron therein for the convenience of the installer.

FIG. 9 through 12 illustrate a second and preferred mode of carpet tape laying tool 51 wherein like elements are assigned the same reference numeral with a script a. The tool includes a frame comprising a pair of generally U-shaped bracket portions 11a,12a joined at their open ends by pivots 13a, the bracket portions having bases 14a or 15a and pairs of sides 16a or 17a, respectively. A removable spindle or axle 52 adapted to carry a roll of carpet tape 23a has a pair of reduced diameter shanks 53,53 forming the ends of the axle 52 to be received in the L-shaped slots 18a adjacent the pivots 13a (see FIG. 12).

A pair of small rollers 26a are mounted on either side of the bracket 11a on a single shaft 27a; the rollers 26a acting at the forward end of the tool to spread the carpet edges so that the carpet tape 28a coming off the roll will be directly fed beneath the forward edge of the heat bonding iron 34a. The operation of this embodiment is similar to that of FIG. 1 except that the shaft 27a for the rollers 26a is not utilized as a separate guide means for the carpet tape coming off the roll.

INDUSTRIAL APPLICABILITY

The present invention finds application in the installation of carpet pieces where seams are necessary because the floor surface is wider than standard carpet pieces.

We claim:

1. An apparatus for the joining of two pieces of carpet abutting along a juncture line to form a seam, comprising an applicator formed of two generally U-shaped bracket portions pivoted together to intersect at an approximate right angle, a removable spindle mounted in one bracket portion adjacent the pivot for holding and feeding a roll of carpet tape having a solid heat-activated adhesive on one surface, a pair of rollers adjacent an end of one bracket portion adapted to contact the floor surface and allow the applicator to move along the surface, and a central arm secured to the end of the opposite bracket portion and extending away from the tape roll, and a heat bonding iron cooperating with said arm to be gripped by the installer and adapted to contact said tape fed from the roll to activate the glue thereon.

2. An apparatus as set forth in claim 1, in which said carpet tape is fed directly off said supply roll to and under the forward edge of said heat bonding iron.

3. An apparatus as set forth in claim 1, in which said tape is fed over guide means on said bracket prior to said heat bonding iron.

4. An apparatus as set forth in claim 3, in which said guide means comprises a shaft extending across said bracket portion and having said rollers mounted thereon.

5. An apparatus as set forth in claim 4, wherein a pair of spaced washers are mounted on said guide shaft to prevent lateral movement of said carpet tape as it is unrolled.

6. An apparatus as set forth in claim 1, wherein said central arm is longitudinally straight but laterally curved.

7. An apparatus as set forth in claim 1, in which said applicator acts to spread the edges of said carpet pieces to allow said tape to be laid onto the floor surface with said glue layer facing upwards and said heat bonding iron contacts said glue layer as said bracket passes thereover, said carpet edges being pressed down by an installer following said heat activating iron.

8. An apparatus as set forth in claim 1, in which said bracket guides said carpet tape to a position under but overlapping the carpet edges when said carpet is pressed down after the glue is heated.

9. An apparatus as set forth in claim 1, wherein each side of said frame portion includes an L-shaped slot formed therein adjacent said pivot, and said spindle is formed with reduced diameter ends to be received within said L-shaped slots.

10. An apparatus as set forth in claim 9, wherein each said L-shaped slot has a closed portion paralleling the bracket portion side and an end opening into the edge of said side adjacent said pivot.

11. An apparatus as set forth in claim 10, in which said second bracket portion uncovers the open ends of said slots when the bracket portions are pivoted away from their right angle position.

12. An apparatus as set forth in claim 1, in which said spindle includes reduced ends received in said L-shaped slots and having an enlarged washer received on each end outside the sides of said bracket portion.

13. An apparatus as set forth in claim 1, in which said central arm is provided with a pair of spring retaining clips secured thereto to yieldably retain the handle of a heat bonding iron.

14. A bracket for the feeding of a carpet tape during installation of carpet pieces requiring a seam, including a pair of U-shaped bracket portions intersecting at a right angle, each bracket portion having a base and a pair of sides, the intersecting sides of each bracket portion being pivotally mounted to each other, a removable spindle extending across one of said bracket portions between the sides and adjacent said pivot to receive a roll of carpet tape to be applied to a floor surface, a pair of rollers adjacent the base of said bracket portion adapted to contact said floor surface, and a centrally located arm secured to the base of said opposite bracket portion to be grasped by a carpet installer.

15. A bracket as set in forth in claim 14, wherein said arm is curved laterally to conformably receive a handle of a heat bonding iron.

16. A bracket as set forth in claim 14, wherein a shaft providing an axle for said rollers extends across said bracket portion between said sides thereof.

17. A bracket as set forth in claim 16, wherein said axle acts as a guide for said tape coming off the roll.

18. A bracket as set forth in claim 17, wherein said tape guide means includes a pair of spaced washers mounted on said shaft, said washers being spaced a distance slightly greater than the width of said tape.

19. A bracket as set forth in claim 14, wherein said one bracket portion includes an L-shaped slot in each side to receive the tape spindle supporting said tape roll.

20. A bracket as set forth in claim 19, wherein said spindle includes a pair of reduced diameter ends extending through said L-shaped slots to retain the spindle therein.

* * * * *